July 24, 1956

C. M. MOORE ET AL 2,755,904

MANUALLY OPERATED PARKING METER

Filed June 6, 1951

INVENTORS
Craig M. Moore
Thomas J. Morgan and
Raymond T. Trier

Frease, Bishop & Hamilton
ATTORNEYS

INVENTORS
Craig M. Moore
Thomas J. Morgan and
Raymond T. Trier

Frease, Bishop & Hamilton
ATTORNEYS

C. M. MOORE ET AL

2,755,904

MANUALLY OPERATED PARKING METER

Filed June 6, 1951

INVENTORS
Craig M. Moore
Thomas J. Morgan and
Raymond T. Trier

Frease, Bishop & Hamilton
ATTORNEYS

United States Patent Office 2,755,904
Patented July 24, 1956

2,755,904

MANUALLY OPERATED PARKING METER

Craig M. Moore and Thomas J. Morgan, Canton, and Raymond T. Trier, North Canton, Ohio, assignors to The Superior Switchboard & Devices Company, Canton, Ohio, a corporation of Ohio Application June 6, 1951, Serial No. 230,236

14 Claims. (Cl. 194—72)

The invention relates generally to parking meters, and more particularly to improvements in a parking meter of the type shown in U. S. Letters Patent No. 2,416,213, issued February 18, 1947 to George H. Partin.

In said patent a setting pawl pivoted on a rotatable setting plate is normally held in inoperative position by a spring, and as the plate is rotated the pawl is moved by contact with a deposited coin into driving engagement with a rack to which the time indicator is secured. A serious objection to this construction is that after the pawl is engaged with the rack, the coin drops so that nothing holds the pawl engaged except the rotating force applied manually to the setting plate by turning the handle, and if the handle is released too soon or the turning force is interrupted, the pawl will disengage prematurely and an amount less than the full amount of time purchased will be shown by the indicator.

Another objection to the construction of said patent is that by inserting a wire hook in the coin entry slot it is possible to hook under and pull the setting pawl into engagement with the rack, so that subsequent rotation of the handle will cause the indicator to show time without depositing a coin.

Still another objection is that as the indicator approaches zero at the end of an elapsed period of time, the expired time signal rises into view very slowly since it is actuated by the pressure of the indicator as driven by the clock mechanism. The result is that to an observer no definite moment is indicated when the elapsed time period ends and the expired time period starts.

It is a general object of the present invention to provide an improved construction which overcomes the foregoing disadvantages.

Another and more specific object is to provide a yieldable coin locating lever which prevents piling up of several coins in the coin channel before turning the handle, which operates through a second coin to release a first coin frozen at the observation window, and which when a coin is jammed against it allows sufficient reverse rotation of the setting plate to release the setting pawl.

Another object is to provide a novel setting pawl which stays engaged with the setting rack until positively moved to inoperative position by a cam.

A further object is to provide novel means for preventing the setting pawl from being pulled into operative engagement with the rack in any unauthorized manner, such as inserting a wire through the coin entry slot.

Another object is to provide improved means for preventing the obtaining of unpaid-for time by oscillating or rocking the setting plate.

A further object is to provide novel means for quickly and easily converting the meter from a one-hour meter to a meter for indicating multiples of one-hour up to and including a six-hour meter.

A further object is to provide improved means for raising the expiration flag instantaneously when tne indicator shows zero time, and for lowering the expiration flag instantaneously when any amount of paid-for time is put on the meter by turning the handle.

A still further object is to provide improved means for adjusting the amount of grace time allowed after the indicator shows zero.

These and other objects are accomplished by the parts, constructions, arrangements and combinations comprising the present invention, the nature of which is set forth in the following general statement, and a preferred embodiment of which is described in the following specification and illustrated in the accompanying drawings as exemplifying the best known mode of carrying out the invention, the scope of the invention being defined in the appended claims forming part hereof.

In general terms, the improvements comprising the present invention include the provision of a frictionally mounted setting pawl which is pivoted on the setting disk for remaining in any position to which it is moved by cam means, the pawl having a lever arm thereon which is slidably engaged by cam guiding elements positioned along the coin channel; a yieldable coin locating lever having a coin engaging arm operating in a notch in the setting disk for positioning a coin in the coin channel, for allowing a limited amount of reverse movement of the setting disk when engaged with a jammed coin, and for urging a second deposited coin downwardly to dislodge a first coin frozen in the observation position; an improved yieldable coin engagement lever for preventing retraction of a coin past the coin retaining points along the coin channel; and improved adjusting means associated with the indicator and the setting rack for converting the meter from a one-hour meter to register total times of multiples thereof, the meter in all adjusted positions cumulatively registering fractional parts of one or more hours when coins of lesser denomination or combinations of coins of different denominations are deposited.

Referring to the drawings in which a preferred embodiment of the invention is shown by way of example.

Similar numerals refer to similar parts throughout the drawings.

Figure 1:
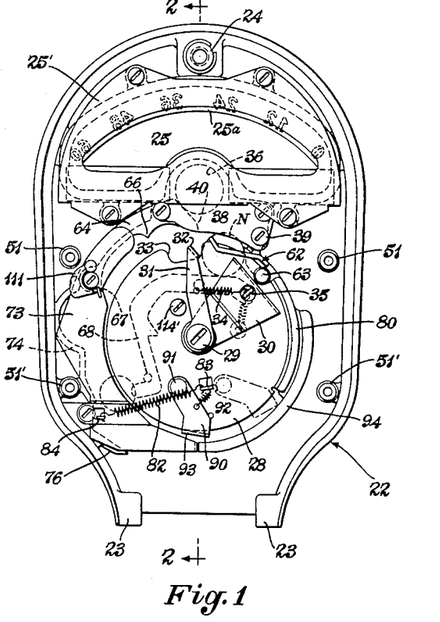
Figure 1 is an interior view of the meter equipped with a one-hour time scale, taken substantially on line 1—1 of Fig. 2, the parts being shown with a nickel coin in the coin channel at the bottom of the coin entry, in readiness to start the resetting operation.
Figure 2:
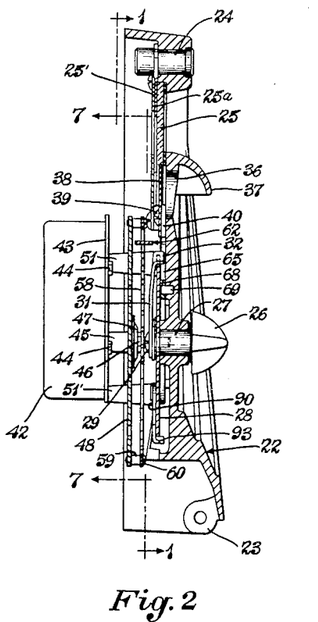
Fig. 2 is a vertical sectional view substantially on line 2—2, Fig. 1.

Referring first to Figs. 1 and 2, one part of a two-part meter housing is indicated generally at 22 and may have hinge portions 23 for connection with the other part of the housing in a usual manner. The other housing part may include or be connected to a coin receptacle and is supported on a post or pedestal in a well known manner. The upper part of the housing 22 preferably has a screw lock 24 for making a locked connection with a screw stud on the other housing part. The particular construction of the meter housing is more or less conventional and forms no part per se of the present invention.

The upper part of the housing may have a glass observation window 25 through which the time scale 25ᵃ and the time indicator are viewed in the usual manner. A detachable window frame plate 25' holds the time scale and window in place. The meter part 22 has a manual operating handle 26 located on the exterior thereof, the handle being secured on the setting shaft 27 which is secured to the setting plate 28 by the screw 29. The setting shaft 27 is journaled in the housing 22 and the setting plate 28 is clamped to the shaft by the screw 29 for turning with the shaft. Between the screw 29 and the setting plate 28 is clamped one end of a flat spring plate 30 and one end of a coin locating lever 31. The spring plate 30 rotates with the setting plate 28 and the outer end of the spring plate 30 presses against the outer peripheral portion of the setting plate so as to maintain a substantially constant depth in the coin channel formed behind the setting plate, in a manner to be more fully described.

The outer end of the coin locating lever 31 is provided with a coin engaging portion 32 which is located in a peripheral notch 33 in the setting plate 28, and a helical spring 34 yieldingly connects the lever 31 to an ear 35 fixed on the setting plate and projecting through a hole in the spring plate 30, so that the coin locating lever is yieldingly urged upwardly against the top edge of the notch 33.

A coin entry opening 36 is located in the housing part 22 preferably just below the window 25, and may have a protecting hood 37 extending downwardly over the top portion thereof. A coin entry back plate 38 is secured on the housing by screws 39 and forms a coin entry slot 40 along the interior surface of the housing part 22 and communicating with the coin entry opening 36. The bottom of the coin entry slot 40 opens into the coin channel formed behind the setting plate 28, and the bottom edge of back plate 38 serves as a cam guide for the setting pawl, as will hereinafter be described.

Figure 3:
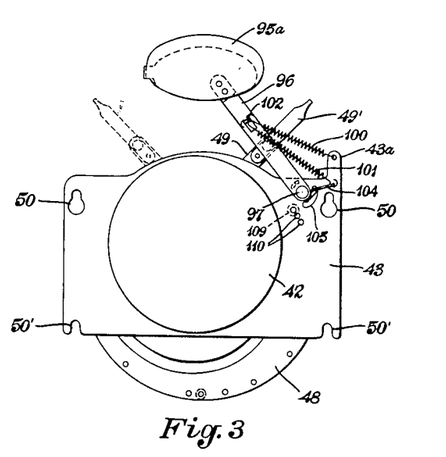
Fig. 3 is a rear elevation view of the indicator, time mechanism and setting rack, detached from the coin controlled resetting mechanism, taken substantially along the line 1—1 of Fig. 2.
Figure 4:
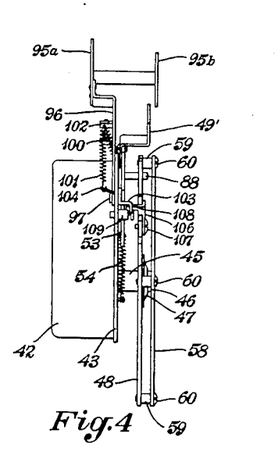
Fig. 4 is a side elevation of the mechanism shown in Fig. 3.

As shown in Figs. 2–4, the clock mechanism which drives the indicator may be mounted within a case 42 and is secured to a mounting plate 43 as by bolts 44. The driven shaft 45 of the clock mechanism is clamped by a nut 46 and a crowned washer 47 to a circular time plate 48 which normally rotates with the shaft 45, but the yielding pressure of the washer 47 allows the time plate 48 to be rotated on the shaft in the opposite direction to reset the indicator 49, which is operatively connected to the time plate 48. The clock mechanism drives the time plate 48 and the indicator from a resetting position toward the zero or time-expired point at a constant speed regulated by an escapement mechanism in a conventional manner.

As indicated in Fig. 3, the mounting plate 43 may be provided with upper key hole slots 50 for attachment by screws to the top mounting studs 51 on housing part 22, and with bottom notches 50' for engaging over screws secured in the bottom mounting studs 51'. Thus, the mounting plate 43 with the time mechanism, time plate and indicator are easily detached as a unit from the coin controlled setting mechanism mounted on the housing part 22.

Figures 7, 8, 9, 10:
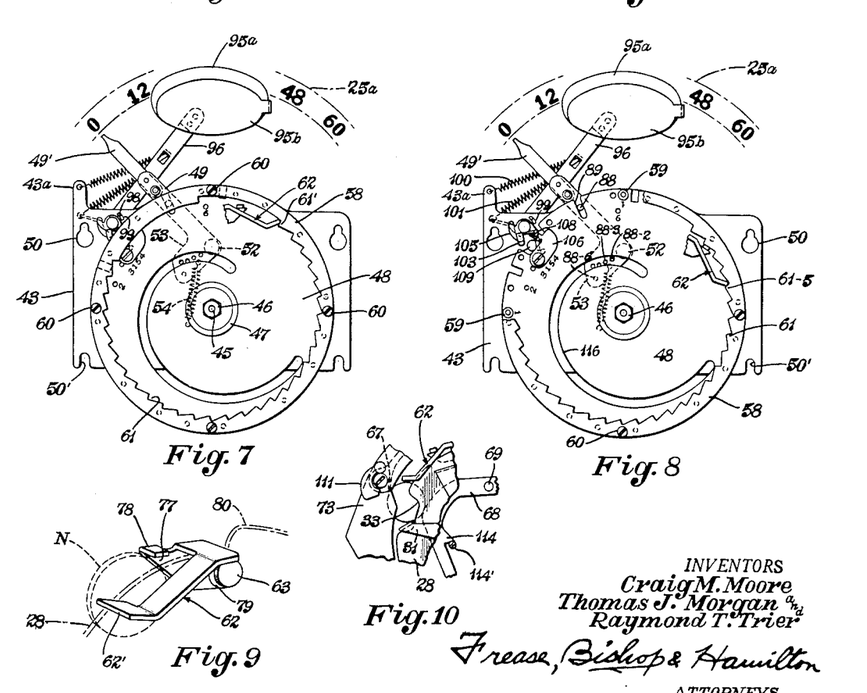
Fig. 7 is an interior view of the meter as on line 7—7, Fig. 2, looking toward the setting rack and time plate which actuates the indicator, showing fragmentarily the position of the setting pawl as engaged with the rack by a nickel coin to start the resetting operation.
Fig. 8 is a view similar to Fig. 7 showing fragmentarily the position of the setting pawl as engaged with the rack by a first penny coin to start the resetting operation.
Fig. 9 is a fragmentary perspective view of the driving pawl showing how a coin engages the cam arm of the pawl to raise it into engagement with the setting rack.
Fig. 10 is a fragmentary view similar to Fig. 6 showing the position of the parts to prevent reverse movement of a penny coin at the penny retaining point, as would be the case in oscillating the setting plate to advance the rack a little at a time without depositing additional coins.

As best shown in Fig. 7, the indicator 49 is pivoted at its lower end at 52 to the mounting plate 43 under the time plate 48. The location of the pivot 52 has a radius measured from the shaft 45 at the center of plate 48 equal to one-half the radius from the shaft 45 to the outer periphery of plate 48, for a purpose to be described. As shown, the lower end of the indicator is provided with an angular arm 53, and a spring 54 connected to the arm and to a pin on the mounting plate 43 urges the indicator 49 and its arm 53 in a counterclockwise direction. Referring to Fig. 3, in dash lines is indicated the position of the indicator when it has been rotated through its full predetermined arc by manual rotation of the handle 26.

An annular setting rack 58 is mounted concentric with and axially spaced from the setting plate 48 by means of internally threaded spacers 59 connected to the plate 48 by screws 60. The rack 58 is provided with an internal series of teeth 61 which are adapted to be engaged by the coin controlled setting pawl indicated generally at 62 and pivotally mounted at 63 on the outer periphery of the setting plate 28.

Referring to Fig. 1, a substantially arcuate plate 64 is secured to the inner surface of the housing part 22 alongside of the periphery of the setting plate 28. The plate 64 is substantially the same thickness as the coin channel 65 (Fig. 2) formed between the plate 28 and the housing part 22, and the upper end of plate 64 may extend under the coin entry back plate 38 and forms one edge of the coin entry slot 40. The plate 64 is provided along its inner edge with coin retainer points or projections 66 and 67 (Fig. 13), the point 66 being adapted to detain a coin of one denomination such as a nickel passing through the coin channel, and point 67 being adapted to detain a coin of smaller denomination such as a penny. As shown in Fig. 1 in dotted lines, a nickel coin N has just entered the coin channel 65 from the coin entry slot 40 and is contacting the pawl 62.

A coin engagement lever 68, best shown in Figs. 1, 2, 5 and 6, pivoted at 69 on the inner surface of the housing part 22, is located behind the setting plate 28 and forms the inner edge of the coin channel 65, the thickness of the lever being substantially equal to the desired depth of the coin channel. The upper end of the lever 68 is urged downwardly by a spring 70 having its lower end attached to the housing part 22, and on the other side of the pivot 69 the lever curves downwardly to form a yielding coin track engaging the edges of coins passing through the coin channel. The lower end of the lever 68 is provided with a curved projection 71 for normally engaging the edge of a coin to hold it in front of a display window 72, commonly known as the "Scotch eye."

Figure 5:
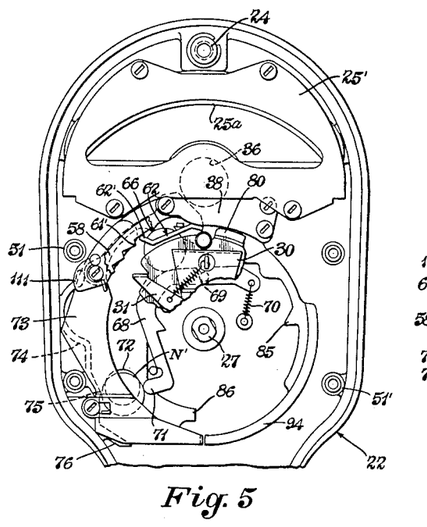
Fig. 5 is an interior view similar to Fig. 1 showing a nickel coin at the nickel retaining projection causing the setting pawl to engage the setting rack, and a previously deposited nickel coin being released at the coin display window.
Figure 6:
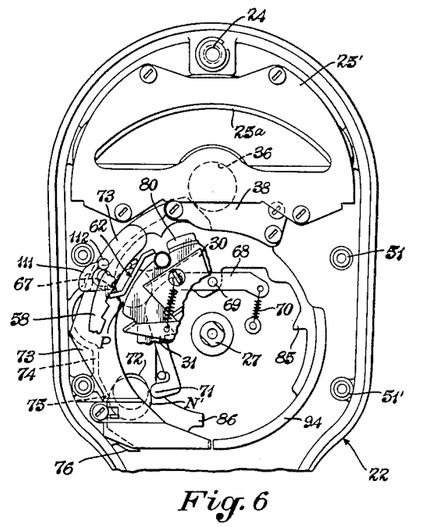
Fig. 6 is a similar view showing a penny coin at the penny retaining position causing the setting pawl to engage the setting rack, and a previously deposited nickel coin being released at the coin display window.

The lower portion of the arcuate plate 64 is preferably overlapped by the upper end of a curved back guide plate 73 which aids in guiding coins to the display window 72, and under the plate 73 a guiding rib 74 is provided on the housing part 22 for guiding the outer edge of the coin. As indicated in Figs. 5 and 6, a projection 75 on the rib 74 cooperates with the projection 71 in holding a coin N' at the display window. When a coin drops from this position at the display window it is guided by the lower end 76 of rib 74 behind the lower end of guide plate 73, and drops into a suitable coin box (not shown).

Referring to Fig. 9, the setting pawl 62 is provided with a rack engaging portion 62' in front of the setting plate 28 and with a cam arm 77 behind the setting plate and having an angular flange 78 at its upper end for slidably engaging the bottom guiding edge of the coin entry back plate 38. The pivot 63 may be a rivet connecting the cam arm 77 to the periphery of the plate 28, and a spring washer 79 is located between the plate 28 and the head of rivet 63 to maintain a sufficient amount of friction between the cam arm 77 and the setting plate 28 so that the pawl will tend to remain in any pivoted position to which it is positively moved.

Adjacent to the pivot 63, the setting plate 28 is provided with an inwardly offset arcuate peripheral portion 80 for slidably contacting the inner surface of the housing part 22 as the setting plate is rotated. Thus, the yielding pressure of the flat spring plate 30 presses the outer peripheral portion of the setting plate 28 inwardly and holds the offset portion 80 against the housing part 22, and the adjacent portion of the plate 28 against the coin engagement lever 68, to maintain the depth of the coin channel 65 constantly at slightly greater than the thickness of the thickest coin passing through the coin channel.

Referring to Figs. 1 and 2, if a coin has been inserted through the coin entry it rests on the upper part of the coin engagement lever 68 in the coin channel 65 and between the cam arm 77 of the pawl 62 and the flange 32 of the coin locating lever 31, as shown by the nickel N in Fig. 1. Thus the first coin deposited prevents entry of another coin into the coin channel, and as the pawl 62 rotates, the flange 78 continues to prevent such entry. As the setting plate 28 is rotated (counterclockwise as viewed in Fig. 1) by turning the handle 26, the arm 77 of pawl 62 carries the nickel N through the coin channel until the edge of the nickel contacts the retainer point 66 as shown in Fig. 5. The sliding engagement of the flange 78 and the guiding edge of back plate 38 holds the pawl down until the coin is past the coin entry slot. This prevents lifting the pawl by inserting a wire in the coin entry to engage the pawl with the setting rack without inserting a coin.

As the setting plate is rotated further, the cam arm rides upwardly on the edge of the coin N as shown in Fig. 9 until the portion 62' of the pawl engages the rack 58 behind the first tooth 61' (Figs. 5 and 7). Now as the setting plate is rotated still further the coin engagement lever 68 will yield radially inward to allow the nickel N to pass by the projection 66, and as the setting plate continues to rotate, the pawl 62 will rotate the rack 58, which in turn rotates the time plate 48 and indicator 49 so that the pointer 49' shows a period of time (in this case one hour as in Fig. 15) on the time scale 25a. When the coin engagement lever 68 yields inwardly due to the nickel N passing the point 66, the projection 71 releases either a nickel coin N' at the display window 72 as in Fig. 5, or a penny coin at the same position.

If a penny coin P is inserted through the coin entry, when the setting plate is rotated the coin (due to its smaller diameter) will pass by the point 66 without raising the pawl portion 62', but the penny will engage the penny retainer point 67 as in Fig. 6 to raise the pawl into engagement with the fifth tooth 61—5 as in Fig. 8. As the setting plate is further rotated, the coin engagement lever 68 will yield radially inward to allow the penny P to drop past the point 67, and to release a coin at the observation window, but the rack will be rotated only a fraction of the amount which it is rotated by a nickel coin, and this amount is related to the time scale so as to reset the indicator to show 12 minutes as in Fig. 16.

As the setting plate is rotated by turning the handle, tension is put on a return spring 82 (Figs. 1 and 11) connected at one end to an ear 83 on the setting plate and at the other end to an ear 84 which may be formed on the guide plate 73. As best shown in Fig. 5, the housing part 22 is provided with a stop projection 85 for limiting the forward movement of the setting plate, and with a stop projection 86 for limiting its return movement, the stops being engaged by a flange 87 on the underside of the setting plate 28 (Fig. 11), thus limiting the total rotation of the setting plate to approximately 90°. However, as seen by referring to Figs. 1 and 5 the setting plate rotates through approximately 45° before the pawl 62 is engaged with the rack 58 by a nickel coin, and therefore the rack is rotated through approximately 45°. Obviously, when a penny coin is deposited the setting plate rotates through approximately 81° before the pawl is engaged with the rack, so that the rack rotates through approximately 9° to move the indicator one-fifth the distance it is moved by a nickel coin.

Insertion of additional pennies accompanied by a full turn of the handle 26, will advance the indicator progressively to 24, 36, 48 and 60 minutes, the second penny causing the pawl to engage the fourth tooth, the third penny the third tooth, the fourth penny the second tooth and the fifth penny the first tooth 61'.

When the meter is operated as a one-hour meter as in Figs. 1–16, the one-hour time scale indicated at 25a in Fig. 1 and diagrammatically in Figs. 7, 8, 15 and 16 is used and the operative connection between the time plate 48 and the indicator 49 is a pin 88 screwed in the indicator and projecting into a peripheral notch 89 in the time plate (Figs. 4 and 8). Since the pivot 52 of the indicator is located on a radius one-half that of the outer periphery of the plate 48, as previously described, as the pin 88 is rotated by the plate 48 the indicator 49 will travel through an arc twice as great as that traveled by the peripheral notch 89. Accordingly, as the rack 58 and plate 48 are rotated through 45° by a nickel coin, the indicator will be rotated through 90° to bring the pointer 49 opposite 60 minutes on the time scale as in Fig. 15. The pin 88 is movable in the notch 89 to compensate for the difference in radii during rotation.

Referring to Fig. 1, a pawl 90 is pivoted at 91 on the lower portion of the setting plate 28 for preventing overspeeding of the setting plate in response to a quick twist of the handle 26, which might result in overswinging of the rack 58 to advance the indicator to show more time than is paid for, and might cause damage to the gearing of the clock mechanism. The pawl 90 is urged radially inward of the setting plate by a spring 92 attached to the ear 83, and preferably has an angular flange 93 at its outer edge. The flange 93 is adapted to engage the inner edge of an arcuate restraining rib 94 on the housing part 22, as indicated in dot-dash lines in Fig. 1, when the handle 26 is given a quick twist such as to throw the pawl outwardly by centrifugal force. This prevents overspeeding of the setting plate and consequent overswinging of the rack 58 due to inertia.

Figure 16:
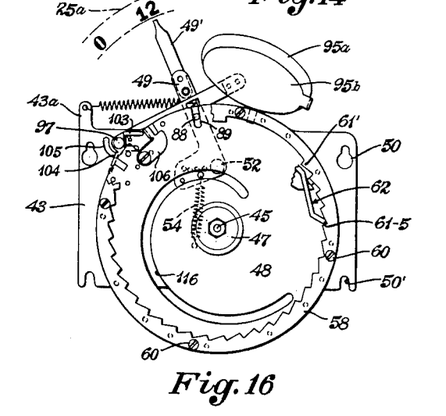
Fig. 16 is a similar view showing the position of the indicator and setting rack at the end of the forward rotation of the setting plate as actuated by a first penny coin.

Referring to Figs. 3, 4, 8 and 16, the expiration flags 95a and 95b (preferably painted red) are mounted on the upper end of a bracket arm 96 which is pivoted at its lower end at 97 to the mounting plate 43, and as shown in Fig. 7 a pin 98 on the arm 96 operates in an arcuate slot 99 in the mounting plate to limit the pivotal movement of the bracket arm between the expired time position of Fig. 7 and the in use position of Fig. 16. Toggle spring 101 and flag counterbalance spring 100 are attached to an ear 102 on the arm 96 for raising the arm instantaneously when the indicator is returned to zero position by the time mechanism, and for lowering the arm instantaneously when the time plate starts to rotate the indicator toward resetting position.

Figure 15:
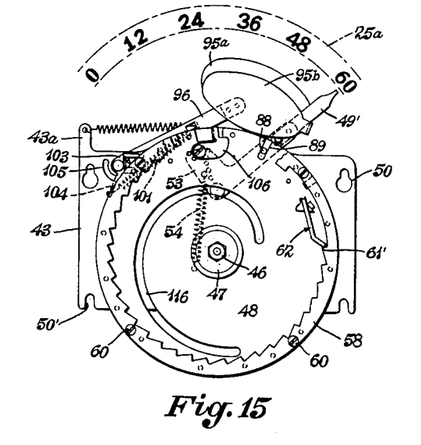
Fig. 15 is a view similar to Fig. 7 showing the position of the setting rack and indicator at the end of the forward rotation of the setting plate as operated by a nickel coin.

In Fig. 3 both springs 100 and 101 are urging the bracket arm to its upper position, and in Fig. 15 the lower end of spring 101 has been moved to the other side of the pivot 97 to urge the bracket arm to its lowered position. The lower end of spring 100 is secured to an ear 43a on the upper edge of plate 43.

The means for swinging the lower end of spring 101 over the pivot 97 preferably includes a forked lever 103, best seen in Fig. 16, journaled on the pivot 97 and having an angular arm 104 extending through an arcuate slot 105 in the plate 43 and attached to the lower end of the spring 101. The means for engaging the forked lever 103 to swing the lower end of spring 101 preferably consists of a stop pawl 106 attached to the time plate 48 by a screw 107 and having a flange 108 extending through a notch in the periphery of plate 48 to engage the lever 103. Adjacent to the pivot 97 is a suitable stud 109 screwed in plate 43 and adapted to be abutted by the pawl 106 after the pawl actuates the lever 103 as indicator is returned to zero by the clock mechanism so that after the indicator reaches zero the clock mechanism will be stopped by contact of the pawl 106 with the stud 109. A short period of time may be allowed between actuation of lever 103 and stopping the clock mechanism as grace time before a violation is assessed, and as shown in Fig. 3, additional holes 110 are provided for the stud 109 for varying the length of the grace period.

In order to provide this grace period without disturbing the relative position of the setting rack 58 with respect to the setting pawl, so that the setting pawl always engages the proper tooth to start the resetting operation, the stroke of the setting pawl is slightly greater than necessary to produce the desired time period on the meter. Accordingly, when the stop stud 109 is set for zero grace period the setting pawl coasts over a portion of the rack or a tooth thereon before engaging the proper tooth and rotating the rack. If the stop is set for a grace period the amount of coasting is decreased so that a slight amount of time actually is put on the meter before the indicator advances past zero on the time scale. At all settings of the stop stud, the expiration flag is raised instantaneously when the indicator returns to zero to signal immediately that the period of grace time or the period of violation has started.

Figure 11:
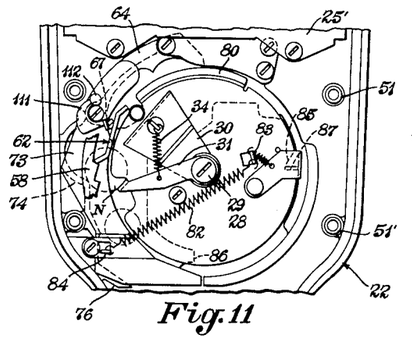
Fig. 11 is a fragmentary view similar to Fig. 6 showing the position of the parts at the end of the forward rotation of the setting plate, and the setting pawl still engaged with the setting rack.

Referring to Fig. 11, when the setting plate 28 has been rotated until the flange 87 thereon abuts the stop 85, the nickel N has dropped below the penny point 67 and is still resting on the coin locating lever 31. As the pawl 62 rotates from the position of Fig. 6 to the position of Fig. 11, the end of the pawl contacts the end of a gravity release pawl 111, and the pawl 111 swings outwardly about its pivot 112, as indicated in Fig. 6, to allow the pawl 62 to pass and move to the position of Fig. 11.

Figure 12:
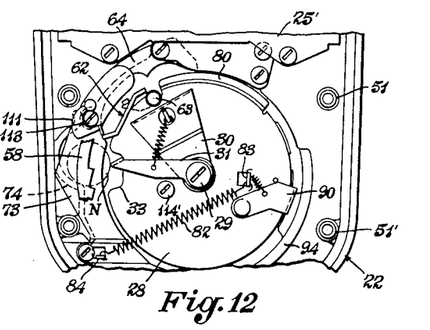
Fig. 12 is a view similar to Fig. 10 showing the position of the parts after the return stroke has started and the setting pawl is disengaged by the release pawl.

As the setting plate 28 is returned by the tension of spring 82, as shown in Fig. 12 the end of pawl 62 engages the inner end of pawl 111 and tends to rotate the pawl 111 inwardly. However, inward rotation of the pawl 111 is prevented by the screw 113, with the result that the pawl 62 is moved radially inward by the pawl 111, thus releasing the pawl 62 from engagement with the rack 58 and it remains released due to its friction pivot 63. Accordingly, the rack 58 remains in its advanced position while the setting plate 28 is returned to its starting position. As the setting plate 28 is returned, the nickel N is rolled into a recess on the rib 74 to allow the end of the locating lever 31 to pass by the coin, whereupon the coin drops and is retained temporarily at the display point as shown in Fig. 5.

Figure 13:
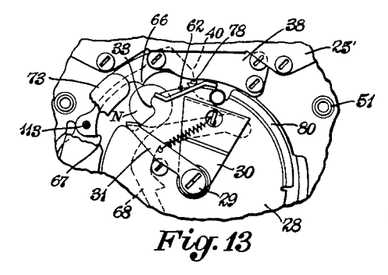
Fig. 13 is a fragmentary view similar to Fig. 5 showing the action of the coin locating lever against a nickel coin jammed at the nickel retaining point as the setting plate is reversely rotated.
Figure 14:
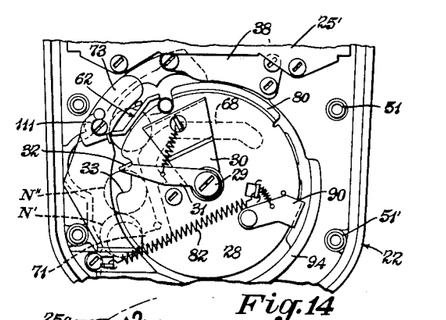
Fig. 14 is a view similar to Fig. 12 showing the action of the coin locating lever in forcing a nickel coin downwardly against a previously deposited nickel coin frozen at the coin display window.

The operation of the coin locating lever 31 in the peripheral notch 33 of the setting plate is shown in Figs. 10, 13 and 14. As shown in Fig. 10, if a penny is jammed between the penny point 67 and the coin engagement lever 68 and it is attempted to put additional unpaid for time on the meter by oscillating the setting plate to cause the pawl 62 to engage successive teeth on the rack, on the reverse rotation of the setting plate the locating lever 31 will engage the penny as shown in Fig. 10 and allow the setting plate to rotate the width of slot 33. This amount of reverse rotation allows the release pawl 111 to disengage pawl 62 from the rack, but in order to re-engage the pawl 62 with another tooth it is necessary to move the penny back past the penny point 67. Such movement of the penny is prevented by a jamming projection or lug 114 on the lever 68 which engages a stop-screw 114' on the setting plate 28 upon clockwise movement (Fig. 10) of the setting plate to prevent further clockwise movement of the setting plate 28. The engagement of a stop-screw 114' with lug 114 to prevent further backward movement of setting pawl 28 also prevents any further yielding movement of the coin engagement lever 68 which would permit the penny to pass upwardly above the penny point 67.

Referring to Fig. 13, if a nickel N is jammed at the nickel point 66 and the setting plate 28 is reversely rotated, the locating lever 31 moves to the bottom of notch 33 which allows sufficient reverse rotation of the setting plate 28 to cause the flange 78 on the cam arm 77 of pawl 62 to slidably engage the lower edge of the coin entry back plate 38 and disengage the pawl 62 from the rack. If the plate 28 is now rocked forwardly, the pawl 62 is again engaged with the same tooth on the rack so that no additional time can be put on the indicator without forcing the nickel past the point 66 and completing the resetting operation.

Referring to Fig. 14, if a coin in the display window as indicated at N', should become frozen in position so that it does not drop when the projection 71 on lever 68 is actuated by the next coin, the second coin will roll back as in Fig. 12 and allow the coin locating lever 31 to pass above it, and the second coin will then drop to rest on the coin N', as indicated at N". Now, if the setting plate 28 is rotated forwardly, the flange 32 on lever 31 will engage the coin N" directly above its center and further forward rotation of the setting plate 28 will force the frozen coin N' downwardly out of the display position.

Figure 17:
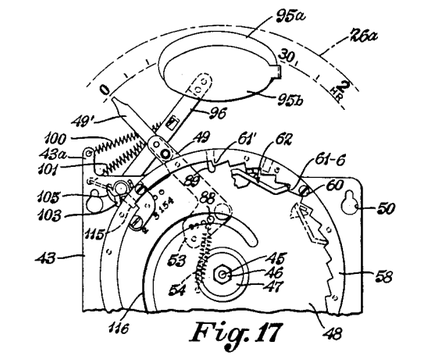
Fig. 17 is a view similar to Fig. 7 showing the indicator and setting rack in adjusted positions for cooperating with a two-hour time scale.
Figure 18:
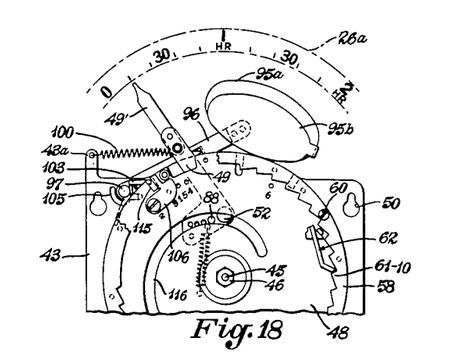
Fig. 18 is a similar view showing the position of the parts as operated by a first penny coin.
Figure 19:
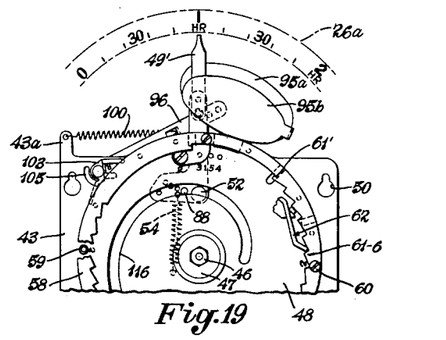
Fig. 19 is a similar view showing the position of the parts as operated by a first nickel coin or a fifth penny coin.

Figs. 17, 18 and 19 show the adjusted positions of the parts when the meter is operated as a two-hour meter. In this case the time scale 26 is replaced by a time scale indicated diagrammatically at 26a in Figs. 17, 18 and 19, the interval between zero and two hours on the time scale being equal to a 90° arc traveled by the indicator about its pivot 52.

In order to convert the meter from a one-hour to a two-hour meter, the rack 58, the pin 88 on the indicator and the stop pawl 106 are all adjusted to new positions on the time plate 48. The four screws 60 which secure the rack to the time plate are unscrewed from the spacers 59, and the rack and spacers are rotated from the positions marked "1" on the plate 48 (Fig. 8) to the holes marked "2" (Fig. 19) and the screws 60 are inserted at those points to secure the rack at a new relative rotative position. Next the screw 107 is removed and the pawl 106 is shifted from the position marked "1" (Fig. 8) to the position marked "2" (Figs. 17—19), there being an adjacent peripheral notch 115 in the plate 48 for the angular arm 108 of the stop pawl 106. Next the pin 88 is removed from the position of Fig. 8 in the intermediate portion of the indicator and screwed in a hole 88—2 provided in the arm 53 of the indicator where the pin projects through a spiral slot 116 in the plate 48, as shown in Figs. 17–19.

The No. 2 positions of the rack 58 and pawl 106 are corelated with the shape of the spiral slot 116 and the position of pin 88 therein, so that as the time plate 48 is rotated through 45° the indicator 49 will be rotated through 45° by the slidable contact of the pin 88 with the inner edge of cam slot 116, the spring 54 acting to hold the pin against the inner edge of the cam slot. Thus, if a nickel coin is inserted in the meter with the indicator at zero as in Fig. 17, due to the rotated position of the rack 58, the pawl 62 will be engaged with the sixth tooth 61—6 of the rack and a full turn of the handle will move the indicator pointer 49' 45° to the one-hour mark as shown in Fig. 19. The rack is then in a position similar to that in Fig. 7, so that if a second nickel coin is deposited, the pawl 62 will be engaged with the first tooth 61'. If the pawl 62 is engaged with the tooth 61' by a second nickel, a full turn of the handle will rotate the indicator pointer 45° to the two-hour mark. If the indicator is at zero as in Fig. 17, and a penny coin is deposited, it will engage the pawl 62 with the tenth tooth 61—10 and a full turn of the handle will rotate the indicator to show twelve minutes on the time scale. Successive pennies deposited will indicate additional twelve-minute periods, or a combination of one nickel and one to five pennies will show one hour plus twelve minutes for each penny deposited.

Figure 20:
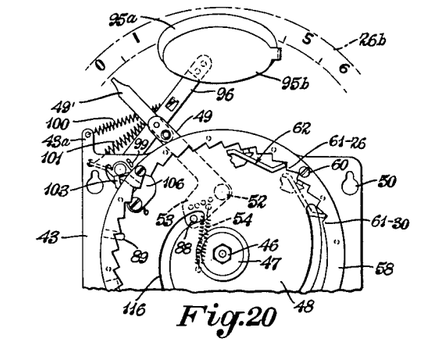
Fig. 20 is a similar view showing the indicator and setting rack in adjusted positions for cooperating with a six-hour time scale.
Figure 21:
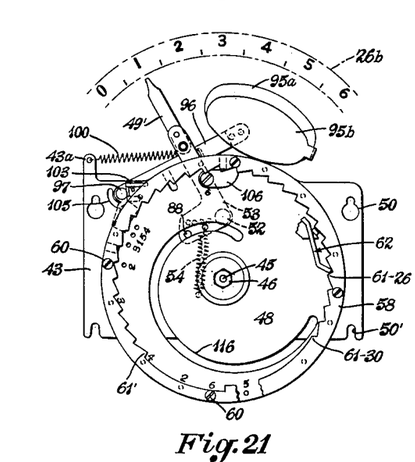
Fig. 21 is a similar view showing the position of the parts as operated by the first nickel coin or the first five penny coins.

If it is desired to convert the meter to a three-hour meter, the time scale is replaced by a three-hour time scale which covers an arc of 90° on the same radius, and the rack 58 and pawl 106 are shifted to positions marked "3" on the time plate, while the pin is moved to the position 88—3 on the indicator arm 53 (Fig. 8). Similar adjusted positions are provided for four, five and six-hour meters, and the six-hour positions are shown by way of example in Figs. 20, 21 and 22.

The six-hour scale is indicated diagrammatically at 26b and covers an arc of 90° about the pivot 52 of the indicator. The screws 60 and the pawl 106 are placed at positions marked "6" on the plate 48, and the pin 88 is placed in the last hole 88—6 on the indicator arm 53. With the parts in these positions, a first nickel coin will engage the pawl 62 with the 26th tooth 61—26, and a full turn of the handle will rotate the indicator only 15° to show one-hour on the indicator as in Fig. 21. If a penny coin is the first coin deposited, the pawl will be engaged with the 30th tooth 61—30 as indicated in dot-dash lines in Fig. 20, and a full turn of the handle will rotate the indicator 3° to show twelve minutes.

Figure 22:
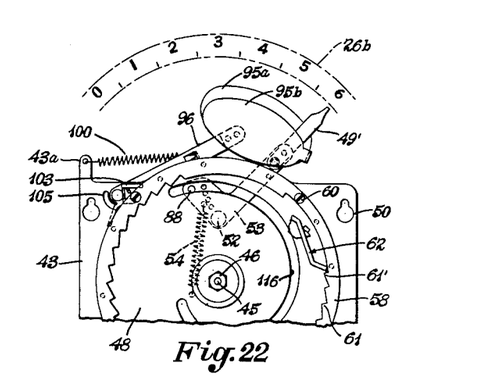
Fig. 22 is a similar view showing the position of the parts as operated by the sixth nickel coin or any combination of nickel and penny coins totaling 30 cents.

Thus, each nickel deposited will move the indicator through one-hour on the time scale and move the rack a distance of five teeth, and each penny deposited will move the indicator twelve minutes and the rack a distance of one tooth. Any combination of nickels and pennies may be used to indicate the proper amount of time accumulated at the rate of one-hour for each nickel and twelve minutes for each penny, until a total of six hours is shown by the indicator. In any case, the last coin deposited will engage the first tooth 61' as indicated in Fig. 22.

The improved manually operated meter is thus easily adjusted to be operated as a one, two, three, four, five or six-hour meter. In each case the meter may be operated with coins of different denominations or combinations thereof to accumulate the proper amount of time on the meter.

While the operation of the meter has been described by way of example, using nickels and pennies, it is obvious that within the scope of the invention coins of other denominations such as nickels and quarters could also be used, in which case the pivot 69 of the coin engagement lever 68 would be shifted to a position where the larger diameter coins would actuate the lever a proper amount when engaging the retaining points 66 and 67 and the jamming screw 115 shifted accordingly. Also, different time scales may be employed for obtaining different total time periods by using different escapement mechanisms for regulating the speed of the time shaft accordingly. The improved meter is relatively simple and inexpensive to manufacture, and overcomes the disadvantages of prior meters of this type.

In the foregoing description, certain terms have been used for brevity, clearness and understanding, but no unnecessary limitations are to be implied therefrom beyond the requirements of the prior art, because such words are used for descriptive purposes herein and are intended to be broadly construed.

Moreover, the embodiment of the improved construction illustrated and described herein is by way of example, and the scope of the present invention is not limited to the exact details of construction.

Having now described the invention, the construction, the operation and use of a preferred embodiment thereof, and the advantageous new and useful results obtained thereby; the new and useful constructions, and reasonable mechanical equivalents thereof obvious to those skilled in the art, are set forth in the appended claims.

We claim:

1. In a parking meter having a rotatable setting disk forming one side of a coin channel, a coin entry slot communicating with said channel, and a setting pawl pivoted on said disk for engagement with a rotatable indicator setting rack by contacting a coin in said channel; means frictionally holding said pawl in any pivotal position, a coin retainer projection at one edge of said coin channel to detain coins of predetermined size, a cam arm on said pawl for slidably engaging the bottom edge of said coin entry slot to hold the pawl down and for then riding up on the edge of a coin detained at said retainer projection to engage the pawl with said indicator setting rack, and a release pawl pivotally mounted adjacent said coin retainer projection permitting forward rotation of said setting disk with the setting pawl in operative position and for disengaging said setting pawl when the setting disk is reversely rotated.

2. In a parking meter having a rotatable setting disk forming one side of a coin channel, a coin entry slot communicating with said channel, and a setting pawl pivoted on said disk for engagement with a rotatable indicator setting rack by contacting a coin in said channel; means frictionally holding said pawl in any pivotal position, a coin retainer projection at one edge of said coin channel to detain coins of predetermined size, a second coin retainer projection spaced from the first for detaining coins of smaller size, a cam arm on said pawl for slidably engaging the bottom edge of said coin entry slot to hold the pawl down and for then riding up on the edge of a coin detained at either of said retainer projections to engage the pawl with said indicator setting rack, and a release pawl pivotally mounted adjacent said second coin retainer projection permitting forward rotation of said setting disk with the setting pawl in operative position and disengaging said setting pawl when the setting disk is reversely rotated past said second coin retainer projection.

3. In a parking meter having a rotatable setting disk forming one side of a coin channel and a setting pawl pivoted on said disk for engagement with a rotatable indicator setting rack by contacting a coin in said channel; a coin retainer at one edge of said coin channel to detain coins of predetermined size, a yieldable coin engagement lever at the other edge of said channel for engaging the edge of a coin of said size and urging it against said retainer, a stop on said disk, and a lug on said coin engagement lever, the disk being rotatable in one direction to set the meter and the stop engaging the lug on reverse rotation of the disk to prevent further yielding of said lever which would allow a coin to be retracted past said retainer.

4. In a parking meter having a rotatable setting disk forming one side of a coin channel and a setting pawl pivoted on said disk for engagement with a rotatable indicator setting rack by contacting a coin in said channel; a coin retainer at one edge of said coin channel to detain coins of predetermined size, a second coin retainer at the edge of said channel to detain coins of smaller size, a yieldable coin engagement lever at the other edge of said channel to force coins of both sizes against the respective retainers, a stop on said disk, and a lug on said coin engagement lever for jamming against said stop to prevent oscillation of the setting plate which would cause the pawl to engage successive teeth on the rack, and to prevent simultaneous further yielding of said lever to allow a coin to be retracted past said second retainer.

5. In a parking meter, a clock, a time shaft extending from said clock, a time plate mounted on said time shaft for rotation therewith; an arcuate indicator setting rack, a rotatably mounted setting disc forming one side of a coin channel, a back plate forming a coin entry slot communicating with said channel, the back plate having a bottom guiding edge, a setting pawl means pivoted on said disc for engagement with said setting rack by contact with a coin in said channel, means frictionally holding said pawl in any pivotal position, the setting pawl means having a flange portion for slidably engaging the bottom guiding edge of the back plate to hold the pawl means disengaged from the rack as the pawl means moves across the coin entry slot, a coin retainer projection at one edge of said coin channel to detain coins of predetermined sizes, and a cam arm on said pawl for riding up on the edge of a coin detained at said retainer projection to engage the pawl with said indicator setting rack for rotation of said rack with rotation of the pawl.

6. In a parking meter, a clock, a time shaft extending from said clock, a time plate mounted on said time shaft for rotation therewith; an arcuate indicator setting rack, an indicator pivotally mounted adjacent said time plate to swing parallel thereto through a predetermined arc for indication of a time period, the time plate having a peripheral notch, a pin on said indicator movably received in said notch whereby said indicator is swung through a predetermined arc with rotation of the time plate through a lesser arc, a rotatably mounted setting disc forming one side of a coin channel, a back plate forming a coin entry slot communicating with said channel, the back plate having a bottom guiding edge, a setting pawl means pivoted on said disc for engagement with said setting rack by contact with a coin in said channel, means frictionally holding said pawl in any pivotal position, the setting pawl means having a flange portion for slidably engaging the bottom guiding edge of the back plate to hold the pawl means disengaged from the rack as the pawl means moves across the coin entry slot, a coin retainer projection at one edge of said coin channel to detain coins of predetermined sizes, and a cam arm on said pawl for riding up on the edge of a coin detained at said retainer projection to engage the pawl with said indicator setting rack for rotation of said rack with rotation of the pawl.

7. In a parking meter, a time mechanism driven shaft, a time plate mounted on said shaft for adjusted rotation therewith, an arcuate indicator setting rack carried on said time plate for relative rotative adjustment therewith, an indicator, means pivotally mounting said indicator under said time plate at a radius from the time shaft equal to one-half the peripheral radius of the time plate for swinging parallel to said time plate, said time plate having a peripheral notch and a spiral cam notch correlated to selective positions of rotative adjustment of said rack, and a pin adjustably mounted on said indicator in selective positions correlated to said adjusted rack positions, said pin being movably received selectively in said notch and in said cam slot, whereby said indicator is swung selectively through its full predetermined arc for a full swing of said rack through an arc one-half as great or through predetermined different fractional parts of its full predetermined arc for each full swing of said rack, a rotatably mounted setting disc forming one side of a coin channel, a back plate forming a coin entry slot communicating with said channel, the back plate having a bottom guiding edge, a setting pawl means pivoted on said disc for engagement with said setting rack by contact with a coin in said channel, means frictionally holding said pawl in any pivotal position, the setting pawl means having a flange portion for slidably engaging the bottom guiding edge of the back plate to hold the pawl means disengaged from the rack as the pawl means moves across the coin entry slot, a coin retainer projection at one edge of said coin channel to detain coins of predetermined sizes, and a cam arm on said pawl for riding up on the edge of a coin detained at said retainer projection to engage the pawl with said indicator setting rack for rotation of said rack with rotation of the pawl.

8. In a parking meter having a rotatable setting disk forming one side of a coin channel, a coin entry slot communicating with said channel and setting pawl means pivoted on said disk for engagement with a rotatable indicator setting rack by contacting a coin in said channel; means frictionally engaging between the disk and pawl holding said pawl in any pivotal position, a coin retainer projection at one edge of said coin channel to detain coins of predetermined size, a coin entry back plate forming one side of the coin entry slot having a bottom guiding edge, and a coin engaging cam arm on said pawl means having a flange portion slidably engaging the bottom of said coin entry back plate to hold the pawl means disengaged from the rack as the pawl means moves across the coin entry slot, said cam arm then riding up on the edge of a coin detained at said retainer projection to move the pawl means into engagement with said indicator setting rack as the disk is rotated.

9. In a parking meter having a rotatable setting disk forming one side of a coin channel, a coin entry slot communicating with said channel and setting pawl means pivoted on said disk for engagement with a rotatable indicator setting rack by contacting a coin in said channel; means frictionally engaging between the disk and the pawl holding said pawl in any pivotal position, a coin retainer projection at one edge of said coin channel to detain coins of predetermined size, a second coin retainer projection spaced from the first for detaining coins of smaller size, a coin entry back plate forming one side of the coin entry slot having a bottom guiding edge, and a coin engaging cam arm on said pawl means having a flange portion slidably engaging the bottom edge of said coin entry back plate to hold the pawl means disengaged from the rack as the pawl means moves across the coin entry slot, said cam arm then riding up on the edge of a coin detained at either of said retainer projections to move the pawl means into engagement with said indicator setting rack as the disk is rotated.

10. In a parking meter having a rotatable setting disk forming one side of a coin channel, a coin entry slot communicating with said channel and setting pawl means pivoted on said disk for engagement with a rotatable indicator setting rack by contacting a coin in said channel; means frictionally engaging between the disk and the pawl holding said pawl in any pivotal position, a coin retainer projection at one edge of said coin channel to detain coins of predetermined size, a coin entry back plate forming one side of the coin entry slot having a bottom guiding edge, said setting disk having a notch in its periphery, a coin locating lever yieldably mounted on said disk and operating in said notch, and a coin engaging cam arm on said pawl means having a flange portion slidably engaging the bottom edge of said coin entry back plate to hold the pawl means disengaged from the rack as the pawl means moves across the coin entry slot, the coin locating lever positioning a deposited coin below the coin entry slot to prevent the deposit of additional coins before the disk is rotated.

11. In a parking meter having a rotatable setting disk forming one side of a coin channel, a coin entry slot communicating with said channel and setting pawl means pivoted on said disk for engagement with a rotatable indicator setting rack by contacting a coin in said channel; means frictionally engaging between the disk and the pawl holding said pawl in any pivotal position, a coin retainer projection at one edge of said coin channel to detain coins of predetermined size, a coin entry back plate forming one side of the coin entry slot having a bottom guiding edge, said setting disk having a notch in its periphery, a yieldable coin engagement lever at the other edge of said channel to force a coin against the coin retainer projection, a coin locating lever yieldably mounted on said disk and having a coin engaging portion operating in said notch, and a coin engaging cam arm on said pawl means having a flange portion slidably engaging the bottom edge of said coin entry back plate to hold the pawl means disengaged from the rack as the pawl means moves across the coin entry slot, the locating lever coin engaging portion normally being yieldingly held in one end of the notch engaging a coin during setting movement of the disk, said portion being held stationary by a coin detained by said projection during limited backward movement of the setting disk, said backward movement being limited by engagement of the other end of the notch with said portion held by said detained coin, and the pawl flange portion slidably engaging the bottom guiding edge of said coin entry back plate during said limited backward movement thereby disengaging the pawl means from the rack.

12. In a parking meter having a rotatable setting disk forming one side of a coin channel, a coin entry slot communicating with said channel and setting pawl means pivoted on said disk for engagement with a rotatable indicator setting rack by contacting a coin in said channel; means frictionally engaging between the disk and the pawl holding said pawl in any pivotal position, a coin retainer projection at one edge of said coin channel to detain coins of predetermined size, a second coin retainer projection at the edge of said channel to detain coins of smaller size, a coin entry back plate forming one side of the coin entry slot having a bottom guiding edge, said setting disk having a notch in its periphery, a yieldable coin engagement lever at the other edge of said channel to force a coin against either of the coin retainer projections, a coin locating lever yieldably mounted on said disk and having a coin engaging portion operating in said notch, and a coin engaging cam arm on said pawl means having a flange portion slidably engaging the bottom edge of said coin entry back plate to hold the pawl means disengaged from the rack as the pawl means moves across the coin entry slot, the locating lever coin-engaging portion normally being yieldingly held in one end of the notch engaging a coin during setting movement of the disk, said portion being held stationary by a coin detained by either of said projections during limited backward movement of the setting disk, said backward movement being limited by engagement of the other end of the notch with said portion held by said detained coin, and the pawl means being disengaged from the rack during said limited backward movement.

13. In a parking meter having a rotatable setting disk forming one side of a coin channel, a coin entry slot communicating with said channel and setting pawl means pivoted on said disk for engagement with a rotatable indicator setting rack by contacting a coin in said channel; means frictionally engaging between the disk and the pawl holding said pawl in any pivotal position, a coin retainer projection at one edge of said coin channel to detain coins of predetermined size, a second coin retainer projection at the edge of said channel to detain coins of smaller size, a coin entry back plate forming one side of the coin entry slot having a bottom guiding edge, said setting disk having a notch in its periphery, a yieldable coin engagement lever at the other edge of said channel to force a coin against either of the coin retainer projections, a coin locating lever yieldably mounted on said disk and operating in said notch, and means for holding a coin for observation at the bottom of said coin channel, the coin locating lever being positioned to engage a coin in the channel below the said second projection and to force it downwardly to the observation point.

14. In a parking meter having a rotatable setting disk forming one side of a coin channel, a coin entry slot communicating with said channel and setting pawl means pivoted on said disk for engagement with a rotatable indicator setting rack by contacting a coin in said channel; means frictionally engaging between the disk and the pawl holding said pawl in any pivotal position, a coin retainer projection at one edge of said coin channel to detain coins of predetermined size, a second coin retainer projection at the edge of said channel to detain coins of smaller size, a coin entry back plate forming one side of the coin entry slot having a bottom guiding edge, said setting disk having a notch in its periphery, a yieldable coin engagement lever at the other edge of said channel to force a coin against either of the coin retainer projections, a coin locating lever yieldably mounted on said disk and operating in said notch, and means for holding a coin for observation at a window at the bottom of said coin channel, the channel having a coin recess below the second retainer projection, the coin locating lever being positioned to engage a later deposited coin lodged upon a previously deposited coin at the observation window and to roll the later deposited coin into the recess to permit the return rotation of the disk.

References Cited in the file of this patent

UNITED STATES PATENTS

| | | |
|---|---|---|
| 2,069,200 | Ackley | Feb. 2, 1937 |
| 2,108,943 | Pryor | Feb. 22, 1938 |
| 2,218,821 | Jennings | Oct. 22, 1940 |
| 2,299,349 | Rockola | Oct. 20, 1942 |
| 2,304,012 | Neff | Dec. 1, 1942 |
| 2,328,043 | Woodruff | Aug. 31, 1943 |
| 2,340,442 | Toce | Feb. 1, 1944 |
| 2,416,213 | Partin | Feb. 18, 1947 |
| 2,563,182 | Michaels | Aug. 7, 1951 |
| 2,599,881 | Woodruff | June 10, 1952 |